(12) United States Patent
Ehmer et al.

(10) Patent No.: US 8,997,970 B2
(45) Date of Patent: Apr. 7, 2015

(54) STORAGE DEVICE

(75) Inventors: Wilfried Ehmer, Dortmund (DE); Ulrich Scholz, Ludinghausen (DE)

(73) Assignee: KHS GmbH, Dortmund (DE)

(*) Notice: Subject to any disclaimer, the term of this patent is extended or adjusted under 35 U.S.C. 154(b) by 0 days.

(21) Appl. No.: 14/007,730

(22) PCT Filed: Nov. 10, 2011

(86) PCT No.: PCT/EP2011/005645
§ 371 (c)(1),
(2), (4) Date: Sep. 26, 2013

(87) PCT Pub. No.: WO2012/130266
PCT Pub. Date: Oct. 4, 2012

(65) Prior Publication Data
US 2014/0014472 A1    Jan. 16, 2014

(30) Foreign Application Priority Data
Mar. 31, 2011 (DE) .......................... 10 2011 015 670

(51) Int. Cl.
B65G 1/00 (2006.01)
B65G 47/66 (2006.01)
B65G 47/51 (2006.01)

(52) U.S. Cl.
CPC ............ B65G 47/66 (2013.01); B65G 47/5131 (2013.01) 198/457.06

(58) Field of Classification Search
CPC ........... B65G 47/5118; B65G 47/5122; B65G 47/5131; B65G 47/766
USPC ................. 198/347.1, 347.4, 457.01, 457.05, 198/457.06
See application file for complete search history.

(56) References Cited

U.S. PATENT DOCUMENTS

| | | | | |
|---|---|---|---|---|
| 2,983,362 A * | 5/1961 | Crist, Jr. | ......................... | 198/547 |
| 4,413,724 A * | 11/1983 | Fellner | .......................... | 198/594 |
| 5,540,320 A * | 7/1996 | Sarto et al. | ................. | 198/473.1 |
| 5,915,916 A * | 6/1999 | Saji | ............................ | 414/749.1 |
| 6,260,688 B1 * | 7/2001 | Steeber et al. | ............. | 198/347.4 |
| 6,497,321 B2 * | 12/2002 | Horton et al. | ................ | 198/594 |
| 6,612,420 B1 * | 9/2003 | Hartness et al. | .............. | 198/597 |
| 7,028,830 B2 * | 4/2006 | Beesley et al. | ................ | 198/594 |
| 7,191,896 B2 * | 3/2007 | Hartness et al. | ............. | 198/594 |
| 7,926,642 B2 * | 4/2011 | Huttner et al. | ............. | 198/347.1 |

(Continued)

FOREIGN PATENT DOCUMENTS

| | | |
|---|---|---|
| CA | 2 364 216 | 12/1944 |
| DE | 20 2004 012 848 | 3/2005 |

(Continued)

*Primary Examiner* — Leslie A Nicholson, III
*Assistant Examiner* — Keith R Campbell
(74) *Attorney, Agent, or Firm* — Occhiuti & Rohlicek LLP (57) ABSTRACT

A storage device for products includes parallel transport elements configured to convey product in opposite directions, and storage sections formed on corresponding transport elements and defining a transport plane. A transfer element includes a transfer section that extends over the transport elements. An actuating drive is arranged beneath the transport plane and coupled to the transfer element to change receiving capacities of the storage sections. The actuating drive is configured to adjust the transfer element by movement along the transport elements. At least one of the transport elements is controllable independently of adjustment of the transfer element.

20 Claims, 5 Drawing Sheets

(56) References Cited

U.S. PATENT DOCUMENTS

| | | | |
|---|---|---|---|
| 8,573,380 B2* | 11/2013 | Petrovic | 198/347.4 |
| 8,668,074 B2* | 3/2014 | Davidson | 198/478.1 |
| 2010/0133067 A1* | 6/2010 | Martinelli | 198/470.1 |
| 2011/0072761 A1* | 3/2011 | Clusserath et al. | 53/266.1 |

FOREIGN PATENT DOCUMENTS

| | | |
|---|---|---|
| DE | 21 2004 000 078 | 8/2006 |
| EP | 1632445 | 3/2006 |
| EP | 1 726 544 | 11/2006 |
| EP | 1726544 | 11/2006 |
| EP | 1807329 | 5/2008 |
| FR | 2887533 | 12/2006 |
| WO | WO2011/012802 | 2/2001 |
| WO | WO02/32797 | 4/2002 |
| WO | WO2006/040058 | 4/2006 |
| WO | WO 2011/012802 | 2/2011 |

* cited by examiner

Fig. 5

STORAGE DEVICE

RELATED APPLICATIONS

This application is the national stage entry of PCT/EP2011/005645 filed Nov. 10, 2011, which claims the benefit of the priority date of German application DE 10 2011 015 670.4, filed on Mar. 31, 2011. The content of the foregoing applications in incorporated herein by reference.

FIELD OF INVENTION

The invention relates to a storage device for products.

BACKGROUND

Storage devices of this type are known in different embodiments and are used in particular also as buffer stores in installations for the processing and/or machining of products. Such storage devices comprise two transport elements arranged parallel to one another and side-by-side. The transport elements have opposed conveying or transport directions and form a transport surface on which the products stand or lie.

At one end of the transport surface, one of the transport elements forms a product entry through which the products are fed to the storage device or to its transport surface. The other transport element forms a product exit through which, in normal operation, the products are discharged out of the storage device or from the transport surface.

A transfer element is typically provided on the transport surface opposite the product entry and the product exit. The transfer element causes the products to be diverted or transferred from one transport element to the other. By adjusting the position of the transfer element with an actuating drive relative to the product entry or product exit, i.e. by changing the distance between the transfer element and the product entry/product exit, the storage or receiving capacity of the storage device or of the storage or buffer sections formed on the transport elements between the transfer element and the product entry/product exit can be varied and adapted to suit the particular requirements.

The transport elements are each formed by at least one transport belt that is driven to circulate in an endless loop. As a rule, there are two or more transport belts. The belts are arranged tightly adjacent to one another at least square to the transport direction.

In known storage devices of the afore-mentioned type, as described in EP 1 807 329 A1 and EP 1 632 445 A1, the transfer element is a passive element, i.e. an element that constitutes only one guide section or transfer section for the products and that consists in essence of a contact or sliding surface for the products. The transfer section, or its contact or sliding surface, extends over the full or essentially full width of the two transport elements and on the side facing the product entry and product exit is concavely arched about at least one axis square to the transport surface or to the transport plane defined by that transport surface.

It is a disadvantage of these known storage devices that the actuating drive for the transfer element is provided above the transport surface or the transport plane. As a result, the accessibility, in particular also the optical accessibility, of the transport surface for an opto-electrical device that is controlling and/or monitoring the storage device is restricted. As a result, an adjustment of the transfer element, and hence a change of the receiving or storage capacity of the storage device, is not possible independently of controlling or regulating of the transport elements, in particular of controlling or regulating of the conveying speed of the transport elements.

Storage devices are also known (DE 20 2004 012 848 U1) that each consist of two transport belts having opposed transport directions that are parallel to, but at a considerable distance from, one another and that are driven to endlessly circulate, and a transfer unit, acting between the transport belts, that can be displaced in the linear direction of the transport belts in order to change the storage or receiving capacity of the storage device and with which the products can be guided from the transport belt forming the product entry to the transport belt forming the product exit. To this end, the transfer unit comprises, for example, a transport element that is driven to rotate about a vertical axis and that takes the products from the one transport belt and moves them to the other transport belt. One of the disadvantages of these known storage devices is that the storage sections that are formed by the two transport elements between the transfer device and the product entry or product exit have a relatively narrow width compared to the maximum diameter of the products. This means that achieving a given maximum storage capacity requires a relatively long overall length of the storage device. A further disadvantage is that when the storage sections are configured with a width greater than the diameter of the products, the transfer device can only be realized with great design complexity. Yet another difficulty is that a trouble-free transfer of the products from the transport element that forms the product entry to the transport element that forms the product exit is not guaranteed.

SUMMARY

An object of the invention is to provide a storage device that, with optimum accessibility of the transport surface or of its storage sections or storage lengths and improved operational reliability, can be realized without great design complexity.

In one aspect, the invention features a storage device for products. Such a storage device includes a first transport element and a second transport element that is parallel to the first. The first transport element is configured to convey product in a first transport direction. The second transport element is configured to convey product in a second direction that is opposite the first direction. First and second storage sections are formed on the first and second transport elements respectively. Together, they define a transport plane. The storage device also includes a transfer element having a transfer section that extends over the first and second transport elements, and an actuating drive arranged beneath the transport plane and coupled to the transfer element to change a receiving capacity of the first storage section and the second storage section. The first transport direction leads towards the transfer section, and the second transport direction leads away from the transfer section. The actuating drive is configured to adjust the transfer element by movement along the first and second transport elements. At least one of the transport elements and the speeds of the transport elements is controllable independently of adjustment of the transfer element. The storage device also has an element for guiding product flow in the first transport direction. This is provided either upstream of the transfer element relative to the transport direction or at the transfer element. The element for guiding product flow is either drivable or movable in a direction parallel to either the transfer element or the transfer section. The element for guiding the flow of products is independently adjustable for changing a distance between itself the transfer element.

In some embodiments, the first transport element and the second transport element are configured to be controlled independently.

In other embodiments, the first transport element is formed by at least one transport belt that forms a closed loop and is driven to circulate, and the second transport element is formed by at least one transport belt that forms a closed loop and that is driven to circulate.

Embodiments also include those that have a driving-and-guiding element, and an actuating drive connected to drive the driving-and-guiding element. In these embodiments, the actuating drive is driven independently of the transport elements, and the transfer element is provided on the driving-and-guiding element. Among these embodiments are those in which the driving-and-guiding element comprises a holding element, which is either a closed-loop-forming band-like holding element, a chain-like holding element, a belt-like element holding element, or a rib-like holding element. Also among these embodiments are those in which the driving-and-guiding element is disposed either beneath the transport plane or beside one of the transport elements.

Some embodiments include a structure that is either a rib, a rib plate, or a holding plate. In either case, the structure is connected to be driven by the actuating drive. The structure extends between the transport elements from an underside of the transport plane and above an upper side of the transport plane, and is guided beneath the transport plane. In some embodiments, the structure is a slot, a wedge, or a shuttle, and within a region occupied by the structure, the transport elements are moved apart by movement of the structure.

In other embodiments, a transfer structure is formed by an element that is driven to circulate. The transfer structure is either the transfer element or at least a part of the transfer section. The element that is driven to circulate is either a conveyor belt that is driven to endlessly circulate or an element that is driven to circulate about an axis that is perpendicular to the transport plane.

Yet other embodiments include those in which the transfer section comprises a first part-section, and a second part-section. The first part-section extends over the first transport element, and the second part-section extends over the second transport element. The first part section defines a first angle relative to a line orthogonal to the first transport direction. The second part section defines a second angle relative to a line orthogonal to the second transport direction. Both angles are acute angles, but the first angle is greater than the second angle.

Other embodiments include product guides disposed between and parallel to the transport elements. The product guides have either a position or a length that is variable and that depends on either position or movement of the transfer element. The product guide is either a telescoping guiding element, a plurality of guiding elements that can be raised above the transport plane and lowered below the transport plane, a plurality of guiding elements that can be raised above the transport plane and tilted below the transport plane, a plurality of lamellae that can be raised above the transport plane and lowered below the transport plane, a plurality of lamellae that can be raised above the transport plane and tilted below the transport plane, a loop of a band that can be driven to endlessly circulate, a loop of a chain element that can be driven to endlessly circulate, a loop of a belt element that can be driven to endlessly circulate, a loop of a band element that can be driven to endlessly circulate and that can be coiled and uncoiled on the transfer element, a loop of a chain element that can be driven to endlessly circulate and that can be coiled and uncoiled on the transfer element, or a loop of a belt element that can be driven to endlessly circulate, and that can be coiled and uncoiled on the transfer element.

Yet other embodiments include a lateral product guide. The lateral product guide can be a band, a chain, or a belt. In either case, it forms a closed loop that can be driven to circulate endlessly.

In some embodiments, the transfer element is a removable transfer element.

Also among the embodiments are those in which the actuating drive comprises a motor, such as a frequency-controlled motor, a servo-motor, or a direct drive.

In another aspect, the invention features an apparatus comprising a storage device for products. In such an apparatus, the storage device comprising a first transport element that is configured to convey product in a first transport direction, and a second transport element parallel to the first transport element that is configured to convey product in a second direction that is opposite the first direction. A first storage section is formed on the first transport element and a second storage section is formed on the second transport element. The first and second storage sections together define a transport plan. The storage device also has transfer element having a transfer section that extends over the first and second transport elements, and an actuating drive that is arranged beneath the transport plane and coupled to the transfer element to change a receiving capacity of the first storage section and the second storage section. The first transport direction leads towards the transfer section. The second transport direction leads away from the transfer section. The actuating drive is configured to adjust the transfer element by movement along the first and second transport elements. Either the transport elements, or the speeds of the transport elements is controllable independently of adjustment of the transfer element. The apparatus further includes product guides disposed between the transport elements and parallel thereto. The product guides have either a position or a length that is variable and that depends on either position or movement of the transfer element. The product guide is either a telescoping guiding element, a plurality of guiding elements that can be raised above the transport plane and lowered below the transport plane, a plurality of guiding elements that can be raised above the transport plane and tilted below the transport plane, a plurality of lamellae that can be raised above the transport plane and lowered below the transport plane, a plurality of lamellae that can be raised above the transport plane and tilted below the transport plane, a loop of a band that can be driven to endlessly circulate, a loop of a chain element that can be driven to endlessly circulate, a loop of a belt element that can be driven to endlessly circulate, a loop of a band element that can be driven to endlessly circulate and that can be coiled and uncoiled on the transfer element, a loop of a chain element that can be driven to endlessly circulate and that can be coiled and uncoiled on the transfer element, or a loop of a belt element that can be driven to endlessly circulate, and that can be coiled and uncoiled on the transfer element.

In some embodiments, the first transport element is formed by at least one transport belt that forms a closed loop and is driven to circulate, and the second transport element is formed by at least one transport belt that forms a closed loop and that is driven to circulate.

Embodiments also include those that have a driving-and-guiding element, and an actuating drive connected to drive the driving-and-guiding element. In these embodiments, the actuating drive is driven independently of the transport elements, and the transfer element is provided on the driving-and-guiding element.

In some embodiments, a transfer structure is formed by an element that is driven to circulate. In these embodiments, the transfer structure is either the transfer element or at least a part of the transfer section. The element that is driven to circulate is either a conveyor belt that is driven to endlessly circulate, or an element that is driven to circulate about an axis that is perpendicular to the transport plane.

Among the embodiments are also those in which the transfer element is a removable transfer element.

Embodiments also include those in which the actuating drive comprises a frequency-controlled motor, a servomotor, or a direct drive.

"Products" in the sense of the invention are in particular packaging elements including, inter alia, already filled packaging elements, as well as packing element groups, i.e. multipacks, each consisting of at least two packaging elements, in particular also consisting of at least two filled packaging elements each.

"Packaging elements" in the sense of the invention are in particular packages or containers usually used in the food industry and specifically also in the drinks sector, including, inter alia, containers such as, for example bottles, cans, also soft packages, for example those produced from cardboard and/or plastic film and/or metal film, transport containers, e.g. bottle cases etc.

For the purpose of the invention the expressions "essentially", "in essence" or "around" mean variations from the respective exact values by +/−10%, preferably by +/−5% and/or variations in the form of changes insignificant for the function.

Further embodiments, advantages and possible applications of the invention arise out of the following description of embodiments and out of the figures. All of the described and/or pictorially represented attributes whether alone or in any desired combination are fundamentally the subject matter of the invention independently of their synopsis in the claims or a retroactive application thereof. The content of the claims is also made an integral part of the description.

BRIEF DESCRIPTION OF THE FIGURES

The invention is explained in detail below through the use of exemplary embodiments with reference to the figures, in which.

DETAILED DESCRIPTION

Figure 1:
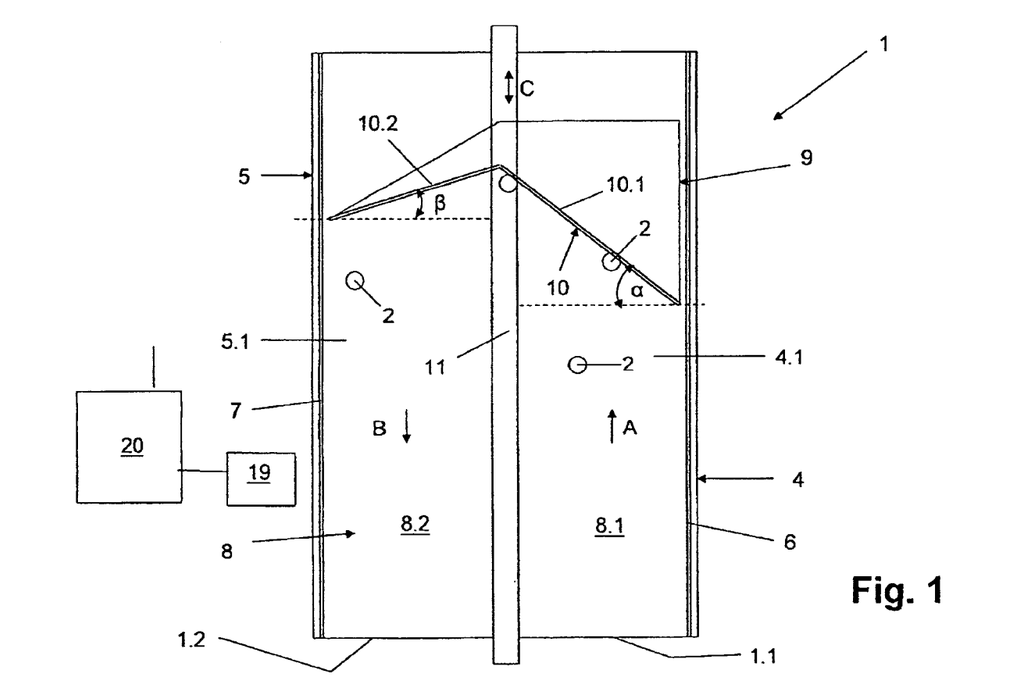
FIG. 1 is a simplified schematic functional representation of a plan view of a storage device according to the invention.
Figure 2:
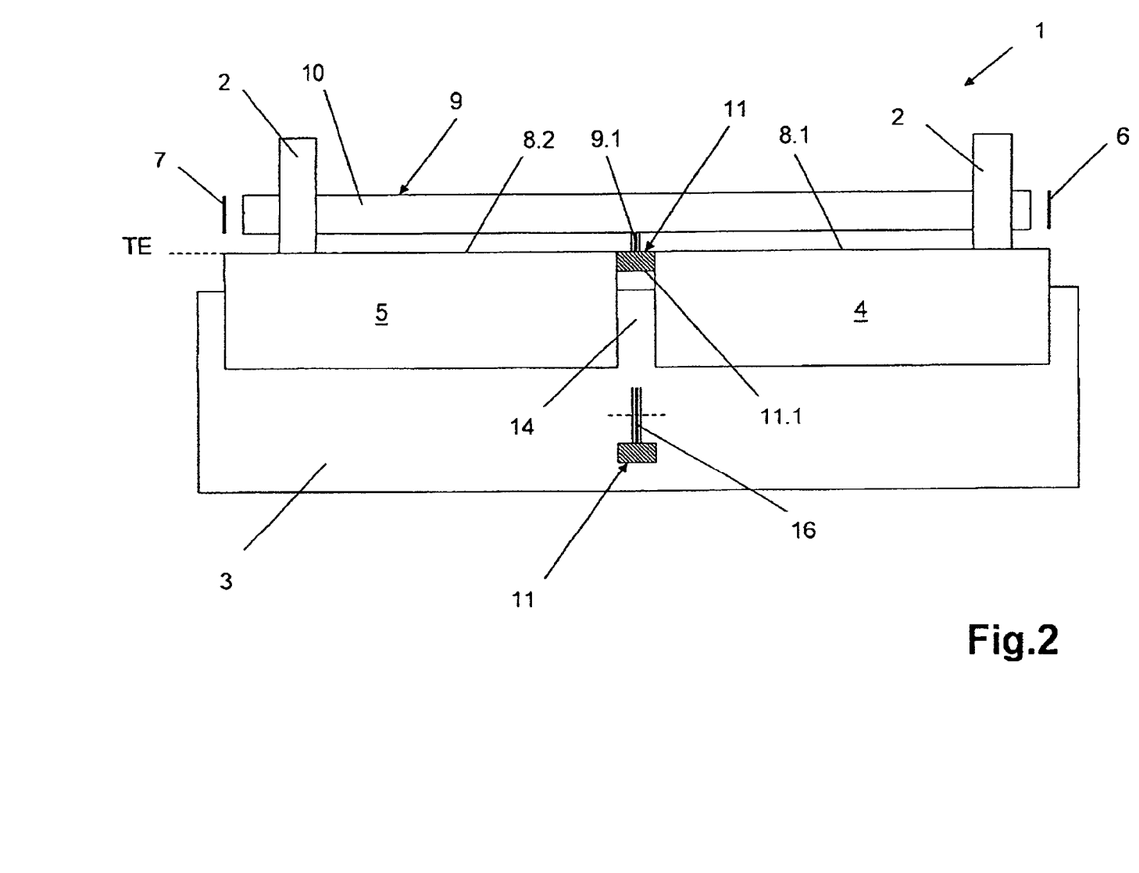
FIG. 2 is the storage device of FIG. 1 in a schematic end-on view looking from the product or container entry or from the product or container exit to the transfer element.
Figure 3:
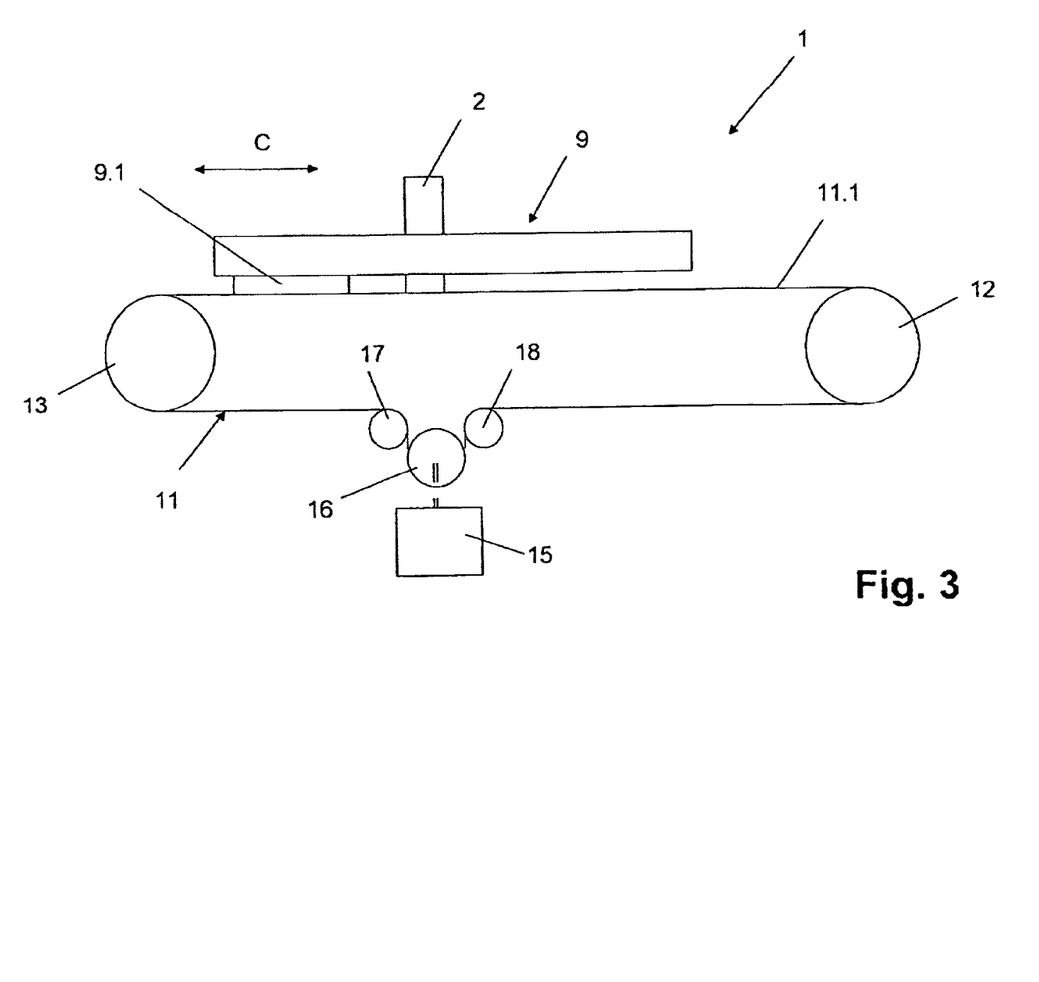
FIG. 3 is a simplified representation of a longitudinal section through the storage device of FIG. 1.

FIGS. 1-3 show a first storage device 1 that acts as a buffer store for the buffering or interim storing of products or product units, in particular of containers 2. In the illustrated embodiment, the first storage device 1 possesses, on a machine frame 3, shown in FIG. 2, first and second transport elements 4, 5 that comprise corresponding endlessly circulating first and second transport belts 4.1, 5.1. The first and second transport belts 4.1, 5.1 form closed loops. The upper lengths of these loops form a common transport surface 8 for containers 2 in a horizontal or essentially horizontal transport plane TE.

The first and second transport elements 4, 5 are arranged parallel to and at some distance away from one another and can be driven by drives (not shown) in such a way that the first transport element 4 has a first transport direction A and the second transport element 5 has a second transport direction B that is opposed to the first transport direction A. During transport, containers 2 stand upright on the transport surface 8, i.e. with their container axes oriented square to the transport plane TE.

At one of its ends, the first transport element 4 forms a product or container entry 1.1 through which containers 2 are fed to the first storage device 1. At an end adjacent to the container entry 1.1, the second transport element 5 forms a product or container exit 1.2 at which containers 2 are discharged out of the first storage device 1.

In the illustrated embodiment, the first and second transport elements 4, 5 have the same width square to their respective first and second transport directions A, B and parallel to a transport plane TE. This width is a multiple of the maximum diameter of the products or of the containers 2.

A vertical center plane M is oriented parallel to the first and second transport directions A, B. Two lateral container guides 6, 7 extend on both longitudinal sides of transport surface 8 in the first and second transport direction A, B, thus laterally limiting that active region of the transport surface 8 that can be occupied by containers 2.

The first storage device 1 has a deflecting or transfer element 9 having a transfer region 10 that extends square to the first and second transport directions A, B over the whole active width of the transport surface 8.

In the illustrated embodiment, the transfer element 9 is configured in such a way that its transfer section 10 has first and second part-sections 10.1, 10.2 that are configured as straight lines. The first part-section 10.1 extends over that part of transport surface 8 formed by first transport element 4. The second part-section 10.1 extends over that part of transport surface 8 formed by the second transport element 5.

The first part-section 10.1 is configured such that, with a horizontal axial direction oriented square to transport direction A and parallel to the transport plane TE, it describes a first angle α of less than 90°, for example an angle ranging from around 30° to 50°, that opens towards the center plane M of the first storage device 1. With a horizontal axis oriented square to the second transport direction B and parallel to the transport plane TE, the second part-section 10.2 describes a second angle, β, that, in the illustrated embodiment, is smaller than the first angle, α, for example 20° to 35°, and that also opens towards the center plane M.

Through the described configuration, containers 2, which are fed at the container entry 1.1 on the part-section of transport surface 8 that is formed by the first transport element 4 between the container entry 1.1 and the transfer section 10, which forms a first storage section 8.1, are moved at least partially to the first part-section 10.1. The containers 2 then slide over this first part-section 10.1 to the second part-section 10.2. As a result, containers 2 move onto the part-section of the transport surface 8 that is formed between the second part-section 10.2 and the container exit 1.2 and that forms a second storage section 8.2. The transferring of containers 2 from the first storage section 8.1 to the second storage section 8.2 is effected by the back pressure generated by containers 2 standing up against one another on the first transport element 4 in the container flow, in part also before they reach the transfer section 10. The transferring of the containers from the first transport element 4 to the second transport element 5 basically always takes place on that partial region of the transport surface 8 that is in front of the transfer element 9 when seen from the container entry 1.1 or the container exit 1.2.

The transfer element 9 can be displaced, under control, parallel to the first and second transport directions A, B, along an adjustment direction C in FIG. 1. For this purpose, the transfer element 9 is provided on a band-like, belt-like or chain-like driving-and-guiding element 11. The driving-and-guiding element 11 forms a closed loop and is guided over at least two guide pulleys 12, 13, best seen in FIG. 3.

A rib 9.1 attaches the transfer element 9 to an upper length 11.1 of the loop formed by driving-and-guiding element 11. The loop formed by the driving-and-guiding element 11 is arranged so that the upper length 11.1 also lies in the transport plane TE and closes a gap 14 between the first and second transport elements 4, 5. The center plane of the loop formed by the driving-and-guiding element 11 is, moreover, also the center plane M.

The driving-and-guiding element 11 is part of a positioning drive for adjusting the position of the transfer element 9 along the adjustment direction C. For this purpose, the driving-and-guiding element 11 is guided beneath the transport plane TE by a drive wheel 16 that is driven by an actuating motor 15 and by first and second guide pulleys 17, 18. The second guide pulley 18 ensures an adequate wrapping of the driving-and-guiding element 11 around the drive wheel 16. By adjusting the position of the transfer element 9, it is possible to vary the storage capacity of first storage device 1 or of the first and second storage sections 8.1, 8.2 as a function, for example, of the size of the container flow at the container entry 1.1, i.e. the number of containers 2 fed per unit time, and/or as a function of the occupancy rate of the part of the transport surface 8 formed between the transfer element 9 and the container entry 1.1 as well as the container exit 1.2. Thus, if the container flow is increased at the container entry 1.1 and/or if the occupancy rate is increased, the transfer element 9 is moved in a way that increases its distance from the container entry 1.1 or the container exit 1.2. If there is a reduction in the container flow or the occupancy rate, a controlled movement of the transfer element 9 is effected in the reverse direction.

The movement or adjustment of the transfer element 9 can be controlled independently of the movement and transport speed of the first and second transport elements 4, 5. It is moreover also possible to control the first and second transport elements 4, 5 and their transport speeds independently of one another.

The control data needed to control or regulate the receiving capacity of the first storage device 1 or of the first and second storage sections 8.1, 8.2 is supplied, for example, by at least one opto-electrical sensing or detecting system 19, shown in FIG. 1, and processed in an electronic controller 20, preferably in a computer-assisted controller, which then triggers the actuating motor 15.

Examples of a sensor system 19 include at least one electronic camera and/or at least one other suitable sensor, such as a laser sensor, ultrasound sensor, an inductively operating sensor, etc., with which the size of the container flow at the container entry 1.1 and/or the occupancy rate of the first and second storage sections 8.1, 8.2 can be captured. The sensor system 19, which can have a variety of different sensors in different regions of the first storage device 1, is generally configured to enable it to capture all relevant current information and data about the operating status of at least one partial region of the first storage device 1.

In the controller 20 or in an evaluation system located therein, the corresponding data, including, for example, image data, is processed, analyzed, and/or evaluated with an appropriate program or with image processing for actively controlling of the transfer element 9. The term "image processing" means that information about containers 2 that are present within the image is obtained with the aid of a suitable program from the image captured by sensor system 19, for example, by the electronic camera of that sensor system 19.

It is, for example, first determined which containers 2 are present within an image. In particular, it is possible in this way to capture the orientation of containers 2 in different regions of the transport surface 8. This enables detection of, for example, containers 2 that are standing upright in the required manner, and any containers that have fallen over and are lying on the transport surface 8. With this configuration of the sensor system 19 and the controller 20, and in particular, with the controller's ability to process the data, including, in particular, the image data supplied by sensor system 19, it is possible to not only optimally adapt the storage or receiving capacity of the first storage device 1 to the prevailing requirements but to also detect and avoid operational stoppages due, for example, to fallen containers 2, containers 2 of a different type etc. Stoppages can be avoided, for example, by giving instructions to the operators of a system that incorporates the first storage device 1 and/or by appropriately controlling the first and second transport elements 4, 5 or other system components preceding or succeeding the first storage device 1.

An appropriate program is preferably used to capture the respective occupancy rates, e.g. number of containers per unit area of the first and second storage sections 8.1 or 8.2, for each individual one of the first and second storage sections 8.1, 8.2 formed by the first and second transport elements 4, 5, for example in a finely graded manner, e.g. in steps of 2% each.

Moreover, the controller 20 controls not only the position of the transfer element 9 but also: the first and second transport elements 4, 5 and/or their respective transport speeds, and preferably the transport speed of the first transport element 4 as a function of the occupancy rate of the transport units or machines connected upstream of the first storage device 1 in a system; and the transport speed of the second transport element 5 as a function of the occupancy rate of transport units or machines that are connected downstream of the first storage device 1.

The transfer element 9 is preferably removable so that containers 2 can be conveyed at least on the first transport element 4 as far as the end of first transport element 4, which lies opposite the container entry 1.1, for example for running first storage device 1 empty.

Figure 4:
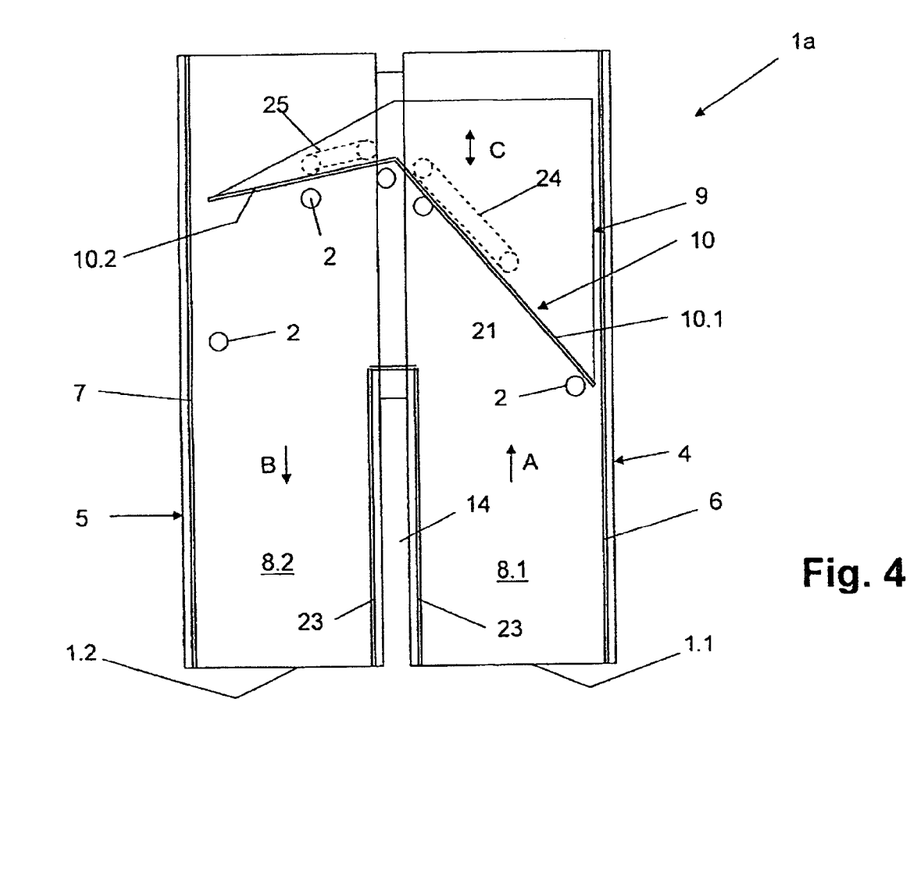
FIGS. 4 and 5 are representations similar to FIGS. 1 and 2 of a further embodiment of the invention.
Figure 5:
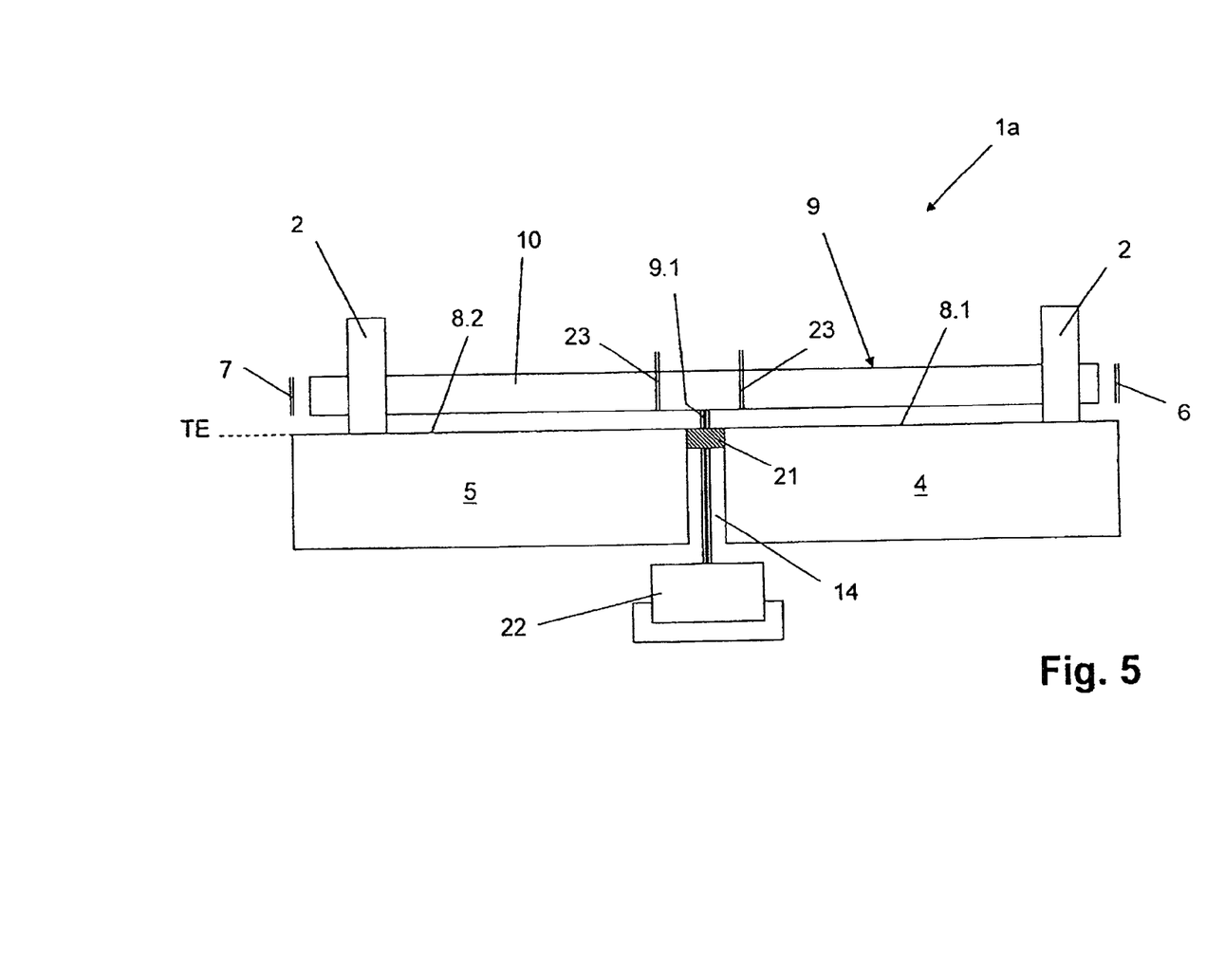

FIGS. 4 and 5 show a second storage device 1a that differs from the first storage device 1 by having a transfer element 9 that is not provided on a driving-and-guiding element 11 that forms a closed loop. Instead, the transfer element 9 is provided on a rail-like holding or bearer element 21 that, together with the transfer element 9, is adjustable or displaceable according along an adjustment direction C, which is parallel to the transport directions A, B, by a positioning drive or a linear drive 22 that is arranged beneath the transport plane TE and controlled, in the manner previously described, by the electronic controller 20 in response to data provided by the sensor system 19. The bearer element 21 is guided on the machine frame 3 such that its upper side lies in the transport plane TE. The bearer element 21 thus closes a gap 14 between the first and second transport elements 4, 5 at least in that region of the transport surface 8 that is adjacent to the transfer element 9 or the transfer section 10.

Since the bearer element 21 only extends over a partial length of the first and second transport elements 4, 5, the second storage device 1a further includes container-guiding means 23. The container-guiding means 23 laterally delimit the first and second transport elements 4, 5, or the first and second storage sections 8.1, 8.2 formed by the transport elements, in that region of the gap 14 that is not closed by the bearer element 21.

The container guiding means 23 can be realized in very different ways. Examples include telescoping container guides, container guiding rails that are attached to the machine frame on the one hand and to the bearer element 21 on the other, and guiding elements that can be lifted and lowered, or that can be tilted, for example lamellar, guiding elements that then project upward above the transport plane TE to guide containers 2 where the gap 14 is not concealed by the bearer element 21 according to the respective positioning of transfer element 9. The guiding elements, which can be lifted and lowered or tilted, are controlled synchronously with the movement of the transfer element 9, for example also by the linear drive 22 or by the transfer element 9 or the bearer element 21.

By the appropriate configuration of first and second transport elements 4, 5, or of the first and second transport belts 4.1, 5.1, which form the first and second transport elements 4, 5, it is also possible to arrange the first and second transport elements 4, 5 such that they adjoin one another laterally without forming a gap 14. The transfer element 9 is held on a holding or bearer element or rib 9.1 that is connected beneath the transport plane TE with the actuating drive arranged there, and that spaces the first and second transport elements 4, 5 apart from one another at the place where the, for example, rod-shaped, wedge-shaped and/or shuttle-shaped bearer element or rib 9.1 is located. The bearer element or rib 9.1 is then preferably on that side of the transfer section 10 facing away from the first and second storage sections 8.1, 8.2.

The invention has been described above by reference to particular embodiments. However, numerous other variations as well as modifications are possible without departing from the concept underlying the invention.

It has been assumed above, for example, that the first and second storage device 1, 1a each have a transfer element 9 having first and second storage sections 8.1, 8.2 associated with this transfer element 9 and conveying in opposite directions. It is also possible to provide two, or more than two, transfer elements 9, each of which has two storage sections having an opposed conveying direction, with the transfer elements 9 following one another in series within the first or second storage device 1, 1a i.e. in the container transport direction through the first or second storage device 1, 1a.

It was also assumed above, and in particular to simplify the description, that the first and second transport elements 4, 5 are each formed by one of the first and second transport belts 4.1, 5.1 respectively. In practice however each of the first and second transport elements 4, 5 preferably comprises a plurality of contiguous transport belts arranged parallel to one another and at least square to the transport direction A, B.

It was furthermore assumed above that the transfer element 9 is a "passive" element, i.e. it has a transfer section 10 that runs at an angle to a respective transport direction A, B and that forms a guiding or sliding surface for containers 2 on which containers 2 slide onto the second storage section 8.2 in particular by the conveying action of the first transport element 4 and assisted by the back pressure of the container flow.

However, in order to further improve the deflecting or transferring of containers 2 from the first transport element 4, or from the first storage section 8.1 there located, onto the second transport element 5 or onto the second storage section 8.2 there located, it is also possible to execute the transfer element 9 in such a way that its transfer section 10 is formed, over a partial length at least, by a circulating transport element, for example by an endlessly circulating transport belt as suggested in FIG. 4 by first and second transport belts 24, 25 and by broken lines. These transport elements can be combined into a single transport element and/or preferably be controllable, in particular, in regard to their speed irrespective of the position of transfer element 9 and/or of the conveying speed of the first and second transport elements 4, 5. Instead of the first and second transport belts 24, 25 that, with the length of their loops facing container entry 1.1 and container exit 1.2, each form an arrangement for containers 2, at least one circulating transport or transfer element of a different type can be provided that, upon facing the first and second storage sections 8.1, 8.2, forms an arrangement and/or a driver section for the containers 2.

Yet another possibility is for the container guides 6, 7, 23 to be formed by elements that move in a transport direction A, B, for example by configuring these container guides as belt-like or chain-like elements that are driven to endlessly circulate and whose loop lengths circulating in the respective transport direction A, B form the corresponding container arrangements or guides. The drives for such container guides are then also preferably arranged beneath the transport plane TE so that the upper side of the storage device and its transport surface is accessible and/or visible without obstruction. This is particularly useful when an opto-electrical sensor systems 19 or corresponding cameras are used for controlling and/or monitoring the first or second storage device 1, 1a.

The possibility also exists of having, in the transport direction A of the first transport element 4 and before the transfer element 9, at least one element that guides the stream of products or containers 2 and that can be driven and/or moved in a direction parallel to the transfer element 9 or its transfer section 10, with the element guiding the flow of containers 2 being, preferably, independently adjustable, for example, also for changing the distance between the element guiding the flow of containers 2 and the transfer element 9 or its transfer section 10.

Having described the invention, and a preferred embodiment thereof, what is claimed as new, and secured by letters patent is:

The invention claimed is:

1. An apparatus comprising a storage device for products, said storage device comprising a first transport element, said first transport element being configured to convey product in a first transport direction, a second transport element parallel to said first transport element, said second transport element being configured to convey product in a second direction, said second direction being opposite said first direction, a first storage section formed on said first transport element, a second storage section formed on said second transport element, said first and second storage sections together defining a transport plane, a transfer element, said transfer element having a transfer section that extends over said first and second transport elements, and an actuating drive arranged beneath said transport plane and coupled to said transfer element to change a receiving capacity of said first storage section and said second storage section, wherein said first transport direction leads towards said transfer section, wherein said second transport direction leads away from said transfer section, wherein said actuating drive is configured to adjust said transfer element by movement along said first and second transport elements, wherein at least one of said transport elements and said speeds of said transport elements is controllable independently of adjustment of said transfer element, wherein said apparatus further comprises an element for guiding product flow in said first transport direction, said element for guiding product flow being provided at a location selected from the group consisting of upstream of said transfer element relative to said transport direction and at said transfer element, wherein said element for guiding product flow is one of drivable and movable in a direction parallel to one of said transfer element and said transfer section, and wherein said element for guiding said flow of products is independently adjustable for changing a distance between said element for guiding said product flow and said transfer element.

2. The apparatus of claim 1, wherein said first transport element and said second transport element are configured to be controlled independently.

3. The apparatus of claim 1, wherein said first transport element is formed by at least one transport belt that forms a closed loop and is driven to circulate, and wherein said second transport element is formed by at least one transport belt that forms a closed loop and that is driven to circulate.

4. The apparatus of claim 1, further comprising a driving-and-guiding element, and an actuating drive connected to drive said driving-and-guiding element, wherein said actuating drive is driven independently of said transport elements, and wherein said transfer element is provided on said driving-and-guiding element.

5. The apparatus of claim 4, wherein said driving-and-guiding element comprises a holding element, wherein said holding element is selected from the group consisting of a closed-loop-forming band-like holding element, a chain-like holding element, a belt-like element holding element, and a rib-like holding element.

6. The apparatus of claim 4, wherein said driving-and-guiding element is disposed at a location selected from the group consisting of beneath said transport plane and beside one of said transport elements.

7. The apparatus of claim 1, further comprising a structure selected from the group consisting of a rib, a rib plate, and a holding plate, said structure being connected to be driven by said actuating drive, wherein said structure extends between said transport elements from an underside of said transport plane and above an upper side of said transport plane, and wherein said structure is guided beneath said transport plane.

8. The apparatus of claim 7, wherein said structure comprises one of a slot, a wedge, and a shuttle, and wherein, within a region occupied by said structure, said transport elements are moved apart by movement of said structure.

9. The apparatus of claim 1, wherein a transfer structure is formed by an element that is driven to circulate, wherein said transfer structure is selected from the group consisting of said transfer element and at least a part of the transfer section, and wherein said element that is driven to circulate is selected from the group consisting of a conveyor belt that is driven to endlessly circulate and an element that is driven to circulate about an axis that is perpendicular to said transport plane.

10. The apparatus of claim 1, wherein said transfer section comprises a first part-section, and a second part-section, wherein said first part-section extends over said first transport element, wherein said second part-section extends over said second transport element, wherein said first part section defines a first angle relative to a line orthogonal to said first transport direction, wherein said second part section defines a second angle relative to a line orthogonal to said second transport direction, wherein said first angle is an acute angle, wherein said second angle is an acute angle, and wherein said first angle is greater than said second angle.

11. The apparatus of claim 1, further comprising product guides disposed between said transport elements and parallel thereto, wherein said product guides have one of a position and a length that is variable and that depends on one of position and movement of said transfer element, wherein said product guide is selected from the group consisting of a telescoping guiding element, a plurality of guiding elements that can be raised above said transport plane and lowered below said transport plane, a plurality of guiding elements that can be raised above said transport plane and tilted below said transport plane, a plurality of lamellae that can be raised above said transport plane and lowered below said transport plane, a plurality of lamellae that can be raised above said transport plane and tilted below said transport plane, a loop of a band that can be driven to endlessly circulate, a loop of a chain element that can be driven to endlessly circulate, a loop of a belt element that can be driven to endlessly circulate, a loop of a band element that can be driven to endlessly circulate and that can be coiled and uncoiled on the transfer element, a loop of a chain element that can be driven to endlessly circulate and that can be coiled and uncoiled on the transfer element, and a loop of a belt element that can be driven to endlessly circulate, and that can be coiled and uncoiled on the transfer element.

12. The apparatus of claim 1, further comprising a lateral product guide, said lateral product guide being selected from the group consisting of a band, a chain, and a belt, wherein said lateral product guide forma a closed loop that can be driven endlessly to circulate.

13. The apparatus of claim 1, wherein said transfer element is a removable transfer element.

14. The apparatus of claim 1, wherein said actuating drive comprises a motor selected from the group consisting of a frequency-controlled motor, a servo-motor, and a direct drive.

15. An apparatus comprising a storage device for products, said storage device comprising a first transport element, said first transport element being configured to convey product in a first transport direction, a second transport element parallel to said first transport element, said second transport element being configured to convey product in a second direction, said second direction being opposite said first direction, a first storage section formed on said first transport element, a second storage section formed on said second transport element, said first and second storage sections together defining a transport plane, a transfer element, said transfer element having a transfer section that extends over said first and second transport elements, and an actuating drive arranged beneath said transport plane and coupled to said transfer element to change a receiving capacity of said first storage section and said second storage section, wherein said first transport direction leads towards said transfer section, wherein said second transport direction leads away from said transfer section, wherein said actuating drive is configured to adjust said transfer element by movement along said first and second transport elements, and wherein at least one of said transport elements and said speeds of said transport elements is controllable independently of adjustment of said transfer element, wherein said apparatus further comprises product guides disposed between said transport elements and parallel thereto, wherein said product guides have one of a position and a length that is variable and that depends on one of position and movement of said transfer element, wherein said product guide is selected from the group consisting of a telescoping guiding element, a plurality of guiding elements that can be raised above said transport plane and lowered below said transport plane, a plurality of guiding elements that can be raised above said transport plane and tilted below said transport plane, a plurality of lamellae that can be raised above said transport plane and lowered below said transport plane, a plurality of lamellae that can be raised above said transport plane and tilted below said transport plane, a loop of a band that can be driven to endlessly circulate, a loop of a chain element that can be driven to endlessly circulate, a loop of a belt element that can be driven to endlessly circulate, a loop of a band element that can be driven to endlessly circulate and that can be coiled and uncoiled on the transfer element, a loop of a chain element that can be driven to endlessly circulate and that can be coiled and uncoiled on the transfer element, and a loop of a belt element that can be driven to endlessly circulate, and that can be coiled and uncoiled on the transfer element.

16. The apparatus of claim 15, wherein said first transport element is formed by at least one transport belt that forms a closed loop and is driven to circulate, and wherein said second transport element is formed by at least one transport belt that forms a closed loop and that is driven to circulate.

17. The apparatus of claim 15, further comprising a driving-and-guiding element, and an actuating drive connected to drive said driving-and-guiding element, wherein said actuating drive is driven independently of said transport elements, and wherein said transfer element is provided on said driving-and-guiding element.

18. The apparatus of claim 15, wherein a transfer structure is formed by an element that is driven to circulate, wherein said transfer structure is selected from the group consisting of said transfer element and at least a part of the transfer section, and wherein said element that is driven to circulate is selected from the group consisting of a conveyor belt that is driven to endlessly circulate and an element that is driven to circulate about an axis that is perpendicular to said transport plane.

19. The apparatus of claim 15, wherein said transfer element is a removable transfer element.

20. The apparatus of claim 15, wherein said actuating drive comprises a motor selected from the group consisting of a frequency-controlled motor, a servo-motor, and a direct drive.

* * * * *